(12) United States Patent
Song et al.

(10) Patent No.: US 10,353,135 B2
(45) Date of Patent: Jul. 16, 2019

(54) BACKLIGHT UNIT AND MOBILE ELECTRONIC DEVICE INCLUDING THE SAME

(71) Applicant: LG Display Co., Ltd., Seoul (KR)

(72) Inventors: Youngki Song, Paju-si (KR); MyungJoon Park, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 79 days.

(21) Appl. No.: 15/392,646

(22) Filed: Dec. 28, 2016

(65) Prior Publication Data

US 2017/0192156 A1 Jul. 6, 2017

(30) Foreign Application Priority Data

Dec. 30, 2015 (KR) .................. 10-2015-0190135

(51) Int. Cl.
 *F21V 8/00* (2006.01)
 *G02F 1/133* (2006.01)
 *G02F 1/1333* (2006.01)
 *G02F 1/1335* (2006.01)

(52) U.S. Cl.
 CPC ......... *G02B 6/0068* (2013.01); *G02B 6/0038* (2013.01); *G02B 6/0045* (2013.01); *G02F 1/13306* (2013.01); *G02F 1/133308* (2013.01); *G02B 6/0036* (2013.01); *G02B 6/0073* (2013.01); *G02F 1/133603* (2013.01); *G02F 1/133615* (2013.01); *G02F 2001/133331* (2013.01); *G02F 2001/133601* (2013.01); *G02F 2001/133607* (2013.01); *G02F 2001/133626* (2013.01)

(58) Field of Classification Search
 CPC .................. G02F 2001/133601; G02B 6/0036
 See application file for complete search history.

(56) References Cited

U.S. PATENT DOCUMENTS

| | | |
|---|---|---|
| 2002/0181223 A1 | 12/2002 | Ryu et al. |
| 2003/0227768 A1 | 12/2003 | Hara et al. |
| 2006/0061705 A1 | 3/2006 | Onishi |
| 2009/0185394 A1 | 7/2009 | Takahashi |
| 2011/0109533 A1* | 5/2011 | Suzuki ................. G02B 6/0038 345/84 |

(Continued)

FOREIGN PATENT DOCUMENTS

| | | |
|---|---|---|
| EP | 2 687 900 A2 | 1/2014 |
| EP | 2 738 452 A1 | 6/2014 |

(Continued)

OTHER PUBLICATIONS

Office Action dated May 9, 2019 with machine translation issued in the corresponding Japanese Patent Application No. 2018-125819, 16 Pages.

*Primary Examiner* — Alexander P Gross
(74) *Attorney, Agent, or Firm* — Polsinelli PC

(57) ABSTRACT

Disclosed is a backlight unit for minimizing consumption power in realizing partial luminance. The backlight unit includes a light guide member including a first light incident part and a second light incident part, a first light source unit disposed in the first light incident part, and a second light source unit disposed in the second light incident part. The first light source unit and the second light source unit have different luminous intensities.

19 Claims, 12 Drawing Sheets

(56) References Cited

U.S. PATENT DOCUMENTS

| | | | |
|---|---|---|---|
| 2012/0105503 A1* | 5/2012 | Tada | G02B 6/0038 |
| | | | 345/690 |
| 2012/0314153 A1 | 12/2012 | Lee et al. | |
| 2013/0155720 A1* | 6/2013 | Kuromizu | G02B 6/0068 |
| | | | 362/609 |
| 2014/0009965 A1 | 1/2014 | Takase | |
| 2015/0219831 A1* | 8/2015 | Tanaka | G02B 6/0051 |
| | | | 349/62 |
| 2015/0226901 A1* | 8/2015 | Lee | G02B 6/0036 |
| | | | 362/607 |
| 2017/0045796 A1* | 2/2017 | Yan | G02B 6/005 |

FOREIGN PATENT DOCUMENTS

| | | |
|---|---|---|
| JP | 2004-013097 A | 1/2004 |
| JP | 2006092768 A | 4/2006 |
| JP | 2012-079681 A | 4/2012 |
| JP | 2012-099365 A | 5/2012 |
| JP | 2012-138222 A | 7/2012 |
| KR | 10-2013-0015584 A | 2/2013 |
| TW | 200501717 A | 1/2015 |
| WO | 2008/059114 A1 | 5/2008 |
| WO | 2012/086221 A1 | 6/2012 |
| WO | 2014/030375 A1 | 2/2014 |

* cited by examiner

BACKLIGHT UNIT AND MOBILE ELECTRONIC DEVICE INCLUDING THE SAME

CROSS-REFERENCE TO RELATED APPLICATIONS

This application claims the benefit of the Korean Patent Application No. 10-2015-0190135 filed on Dec. 30, 2015, which is hereby incorporated by reference in its entirety as if fully set forth herein.

BACKGROUND

Field of the Disclosure

The present invention relates to a display device, and more particularly, to a backlight unit and a mobile electronic device including the same. Although the present disclosure is suitable for a wide scope of applications, it is particularly suitable for minimizing consumption power of the backlight unit when partial luminance is realized.

Description of the Background

Generally, liquid crystal display (LCD) devices are being widely used as display screens of various electronic products such as televisions (TVs), notebook computers, monitors, cameras, camcorders, appliances including a display, etc., in addition to mobile electronic devices such as electronic notebooks, e-books, portable multimedia players (PMPs), navigation devices, ultra-mobile personal computers (UMPCs), mobile phones, tablet personal computers (PCs), smartwatches, watch phones, wearable devices, mobile communication terminals, etc.

Recently, mobile devices have a partial display function for quickly executing a message function, a call function, a music reproduction function, a watch function, a camera function, and/or the like by using a fast execution screen which is locally displayed on a display screen of a liquid crystal display panel.

FIG. 1 is a diagram for describing a partial display function of a related art mobile electronic device.

Referring to FIG. 1, the related art mobile electronic device includes a liquid crystal display panel 10, which displays a partial display screen 12, and a backlight unit 20 that irradiates light 25 onto a rear surface of the liquid crystal display panel 10.

The liquid crystal display panel 10 includes a plurality of pixels and displays the partial display screen 12 on a predetermined local area by turning on a thin film transistor (TFT) which is provided in each of the plurality of pixels.

The backlight unit 20 includes a light guide member 21, which is disposed on the rear surface of the liquid crystal display panel 10, and a light source unit 23 including a plurality of light emitting diodes (LEDs) that irradiate light onto one side surface of the light guide member 21.

In the related art mobile electronic device, when the partial display function is performed, the backlight unit 20 drives all of the plurality of LEDs to irradiate the light 25 onto the whole rear surface of the liquid crystal display panel 10, and the liquid crystal display panel 10 locally displays the partial display screen 12 through partial driving. That is, the related art mobile electronic device displays the partial display screen 12 by driving all the LEDs of the backlight unit 20 and partially driving the liquid crystal display panel 10.

In the related art mobile electronic device, when displaying the partial display screen 12, power is unnecessarily consumed by LEDs irrelevant to the partial display screen 12. For this reason, since the related art mobile electronic device cannot control the partial luminance of the backlight unit 20, all the LEDs of the backlight unit 20 are driven when executing the partial display function, causing an unnecessary increase in consumption power.

SUMMARY

Accordingly, the present disclosure is directed to provide a backlight unit and a mobile electronic device including the same that substantially obviate one or more problems due to limitations and disadvantages of the related art.

An aspect of the present disclosure is directed to provide a backlight unit for reducing, e.g. minimizing consumption power when realizing partial luminance.

Another aspect of the present disclosure is directed to provide a mobile electronic device for reducing, e g minimizing consumption power when a partial display screen is displayed through partial driving of a backlight unit.

Various aspects of the disclosure provide a backlight unit. The backlight unit may include a light guide member including a first light incident part on a first side surface and a second light incident part on a second side surface opposite to the first side surface, a first light source unit in the first light incident part, and a second light source unit in the second light incident part. The first light source unit and the second light source unit may have different a luminous intensity.

In various aspects of the disclosure, the light guide member includes a partial light output area defined between the second light incident part and a center portion between the first light incident part and the second light incident part.

In various aspects of the disclosure, the first light source unit has a luminous intensity which is higher than a luminous intensity of the second light source unit.

In various aspects of the disclosure, the light guide member includes a base member including the first light incident part and the second light incident part, and a plurality of optical patterns provided on a bottom of the base member.

In various aspects of the disclosure, the light guide member includes a base member including the first light incident part and the second light incident part, and a plurality of lens patterns provided on a top of the base member.

In various aspects of the disclosure, in each of the plurality of optical patterns, a cross-sectional surface in a first direction parallel to a lengthwise direction of the first light incident part has a trapezoid shape, and a cross-sectional surface in a second direction intersecting the lengthwise direction of the first light incident part has an obtuse-angled triangular shape.

In various aspects of the disclosure, each of the plurality of optical patterns includes a first inclined portion including a first inclined surface inclined in a direction from a bottom of the base member to the second light incident part to face the first light incident part, and a second inclined portion including a second inclined surface inclined in a direction from the bottom of the base member to an end of the first inclined portion to face the second light incident part.

In various aspects of the disclosure, a first included angle between the bottom of the base member and the first inclined surface is greater than a second included angle between the bottom of the base member and the second inclined surface, and an included angle between the first inclined surface and the second inclined surface is an obtuse angle.

In various aspects of the disclosure, the first included angle between the bottom of the base member and the first inclined surface is 30 degrees to 50 degrees, and the second included angle between the bottom of the base member and the second inclined surface is 5 degrees to 10 degrees.

In various aspects of the disclosure, the first light source unit includes a plurality of first light emitting diode (LED) packages including i (where i is a positive integer equal to or more than two) number of LED chips, and the second light source unit includes a plurality of second LED packages including j (where j is a positive integer less than i) number of LED chips.

In various aspects of the disclosure, the light guide member outputs lights, which are incident from some of the plurality of second LED packages, toward the partial light output area.

In various aspects of the disclosure, the partial light output area has a smaller width than the backlight unit.

Various aspects of the disclosure provide a mobile electronic device, including the backlight unit as described above or as will be described in more detail below, a housing accommodating the backlight unit, a liquid crystal display panel disposed on the backlight unit and accommodated into the housing, and a cover window supported by the housing to cover the liquid crystal display panel.

In various aspects of the disclosure, the first light source unit includes a plurality of first light emitting diode (LED) packages including i (where i is a positive integer equal to or more than two) number of LED chips, and the second light source unit includes a plurality of second LED packages including j (where j is a positive integer less than i) number of LED chips.

In various aspects of the disclosure, the mobile electronic device further includes a panel driving circuit unit connected to the liquid crystal display panel and accommodated into the housing. The panel driving circuit unit displays a partial display screen on a partial display area defined in the liquid crystal display panel, and the backlight unit selectively drives the plurality of second LED packages to irradiate light onto the partial display area.

Additional advantages and features of the disclosure will be set forth in part in the description which follows and in part will become apparent to those having ordinary skill in the art upon examination of the following or may be learned from practice of the disclosure. The objectives and other advantages of the invention may be realized and attained by the structure particularly pointed out in the written description and claims hereof as well as the appended drawings.

To achieve these and other advantages and in accordance with the purpose of the disclosure, as embodied and broadly described herein, there is provided a backlight unit including a light guide member including a first light incident part and a second light incident part, a first light source unit disposed in the first light incident part, and a second light source unit disposed in the second light incident part, wherein the first light source unit and the second light source unit have different a luminous intensity. Accordingly, consumption power is minimized in realizing partial luminance.

In another aspect of the present disclosure, there is provided a mobile electronic device including a backlight unit, including a light guide member including a first light incident part and a second light incident part, a first light source unit disposed in the first light incident part, and a second light source unit disposed in the second light incident part, the first light source unit and the second light source unit having different a luminous intensity, a housing accommodating the backlight unit, a liquid crystal display panel disposed on the backlight unit and accommodated into the housing, and a cover window supported by the housing to cover the liquid crystal display panel. Accordingly, consumption power is minimized in a case where a partial display screen is displayed through partial driving of the backlight unit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
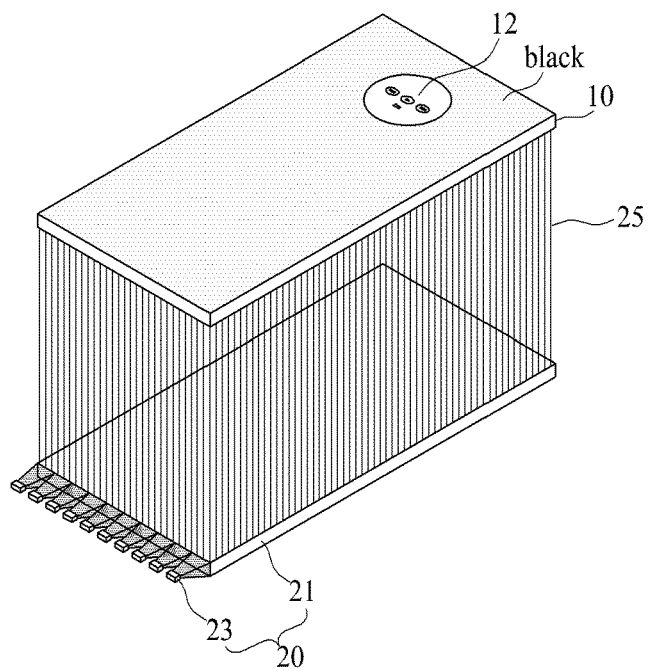
FIG. 1 is a diagram for describing a partial display function of a related art mobile electronic device.

Reference will now be made in detail to the aspects of the present disclosure, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, aspects of a backlight unit and a mobile electronic device including the same according to the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

Figure 2:
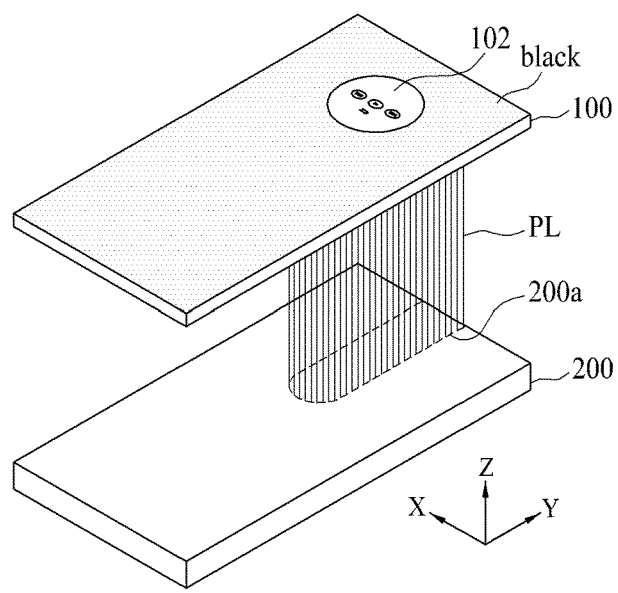
FIG. 2 is a diagram for describing a partial display function of a mobile electronic device according to an aspect of the present disclosure.

FIG. 2 is a diagram for describing a partial display function of a mobile electronic device according to an aspect of the present disclosure.

Referring to FIG. 2, the mobile electronic device according to an aspect of the present disclosure may include a liquid crystal display panel 100, which displays a partial display screen 102, and a backlight unit 200 that irradiates partial light PL onto a partial display area (or a partial driving area) corresponding to the partial display screen 102 defined in the liquid crystal display panel 100.

The liquid crystal display panel 100 may include a plurality of pixels and display the partial display screen 102 on the partial display area by turning on a respective thin film transistor (TFT) provided in each of the plurality of pixels. Here, the partial display area may be provided in a partial area of a display area defined in the liquid crystal display panel 100, and the other display area except for the partial display area may be maintained in a black state.

The partial display screen 102 may display an image pattern corresponding to each of partial display applications for performing a message function, a call function, a music reproduction function, a watch function, and a camera function, etc. The partial display screen 102 according to an aspect of the disclosure may be displayed in a circular shape on an upper edge with respect to a long side lengthwise direction Y of the liquid crystal display panel 100, but is not limited thereto. In other aspects, the partial display screen 102 may be displayed in a polygonal shape, a heart shape, an elliptical shape, or the like. According to another aspect, the partial display screen 102 may be simply displayed in a text form or an image pattern form without having a special form in the partial display area. The partial display screen 102 may be displayed in a standby mode of the mobile electronic device, and particularly, in the watch function, the partial display screen 102 may be always displayed in the standby mode of the mobile electronic device.

The backlight unit 200 may irradiate global light onto a rear surface of the liquid crystal display panel 100 or may irradiate the partial light PL onto the partial display area defined in the liquid crystal display panel 100. That is, the backlight unit 200 may irradiate light onto the whole display area of the liquid crystal display panel 100 when the entire liquid crystal display panel 100 is driven. On the other hand, when the liquid crystal display panel 100 is partially driven according to execution of a partial display application installed in the mobile electronic device, the backlight unit 200 may irradiate the partial light PL, which is output through only a partial light output area 200a which is provided to overlap the partial display area of the liquid crystal display panel 100, onto the partial display area of the liquid crystal display panel 100 in response to local dimming control.

In the mobile electronic device according to an aspect of the present disclosure, when the liquid crystal display panel 100 is partially driven according to execution of the partial display application, light may be irradiated onto only the partial display area of the liquid crystal display panel 100 through partial driving of the backlight unit 200, thereby reducing consumption power.

Figure 3:
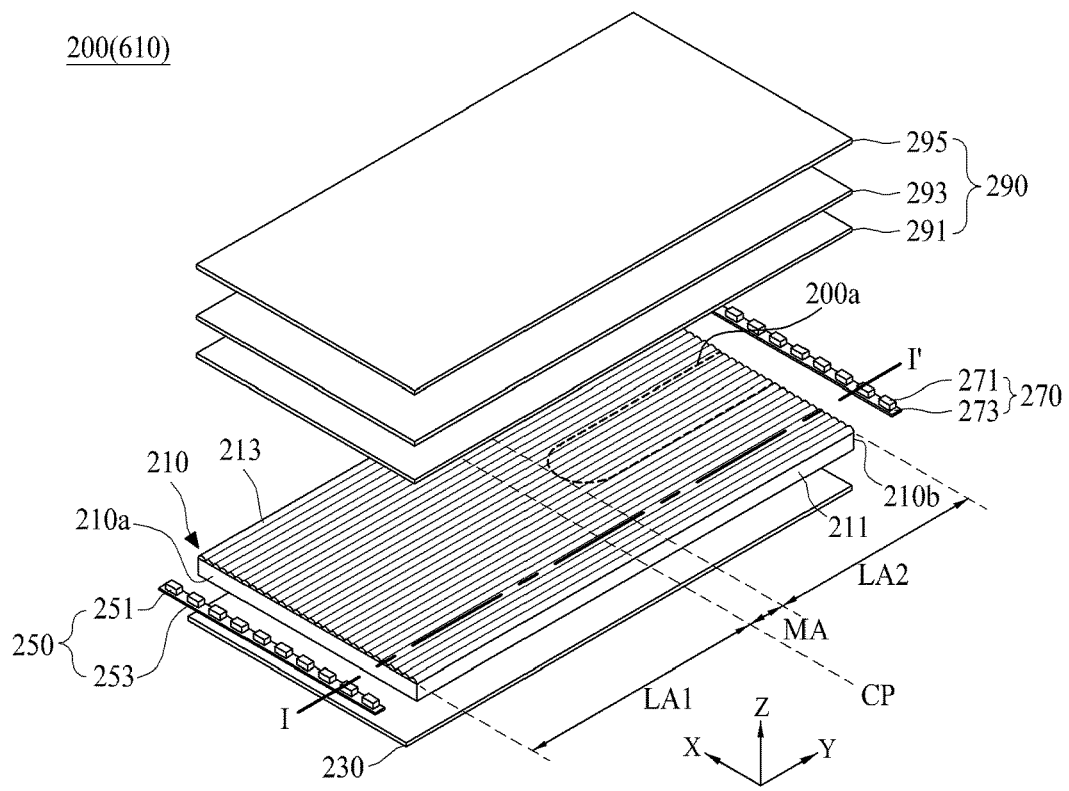
FIG. 3 is an exploded perspective view for describing a backlight unit according to an aspect of the present disclosure.
Figure 4:
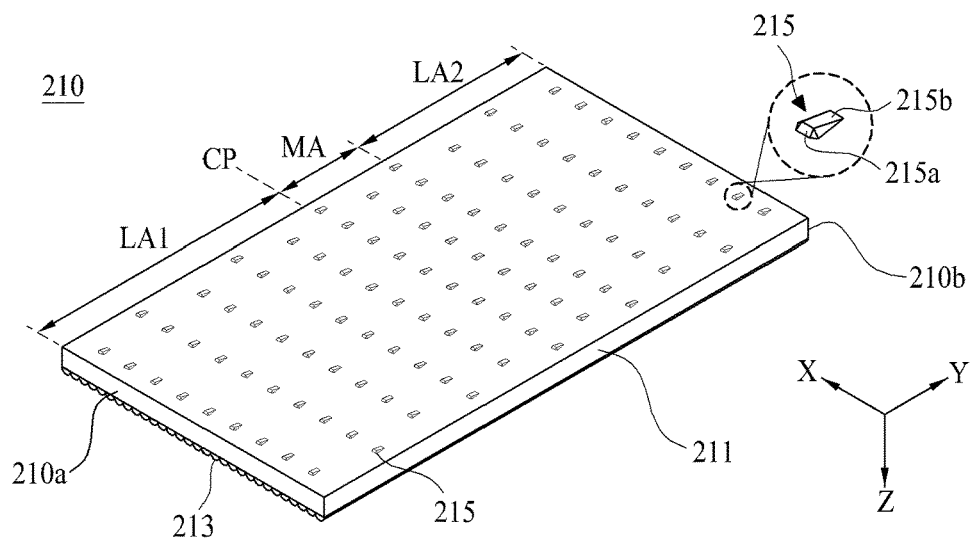
FIG. 4 is a diagram for describing an optical pattern of a light guide member illustrated in FIG. 3.

FIG. 3 is an exploded perspective view for describing a backlight unit 200 according to an aspect of the present disclosure, and FIG. 4 is a diagram for describing an optical pattern of a light guide member illustrated in FIG. 3.

Referring to FIGS. 3 and 4, the backlight unit 200 according to an aspect of the present disclosure may include a light guide member 210, a reflective sheet 230, a first light source unit 250, a second light source unit 270, and an optical sheet part 290.

The light guide member 210 may output light, which is incident from at least one of the first light source unit 250 and the second light source unit 270, in an upward direction Z (for example, a liquid crystal display panel). The light guide member 210 may include a first light incident part 210a provided on a first side surface, a second light incident part 210b provided on a second side surface opposite to the first side surface, and a partial light output area 200a defined between the second light incident part 210b and a center portion CP between the first light incident part 210a and the second light incident part 210b. The partial light output area may have a smaller width than the backlight unit. In other words, the partial light output area may be narrower in x-direction (see coordinate system in FIG. 2) than the backlight unit. The light guide member 210 may irradiate the light, which is incident from at least one of the first light source unit 250 and the second light source unit 270 which are selectively driven based on a driving type of the liquid crystal display panel, onto the liquid crystal display panel. For example, when the liquid crystal display panel is wholly driven (or globally driven), the light guide member 210 may guide lights, which are incident from both the first light source unit 250 and the second light source unit 270, toward the liquid crystal display panel to irradiate global light onto a display area of the liquid crystal display panel. Also, when the liquid crystal display panel is partially driven, the light guide member 210 may guide light, which is incident from the second light source unit 270, toward the partial light output area 200a to irradiate the light onto only a partial display area of the liquid crystal display panel.

The light guide member 210 according to an aspect of the disclosure may include a base member 211, a plurality of lens patterns 213, and a plurality of optical patterns 215.

The base member 211 may have a plate shape including a short side and a long side. The base member 211 may include the first light incident part 210a and the second light incident part 210b.

The first light incident part 210a may be a first side surface of the base member 211, and the second light incident part 210b may be a second side surface of the base member 211. Here, in the base member 211, the first side surface may be defined as one short side, and the second side surface may be defined as the other short surface opposite to the first side surface.

The base member 211 may include a first light guide area LA1, a second light guide area LA2, a light guide overlap area MA, and the partial light output area 200a.

The first light guide area LA1 may be defined as an area through which main light of light incident through the first light incident part 210a are output in a direction toward an upper surface. That is, the first light guide area LA1 may be an area through which light incident through the first light incident part 210a travels to a relatively long distance. For example, the first light guide area LA1 may be defined as an area between the first light incident part 210a and the center portion CP with respect to the center portion CP between the first light incident part 210a and the second light incident part 210b.

The second light guide area LA2 may be defined as an area through which main lights of lights incident through the second light incident part 210b are output in the direction toward the upper surface. That is, the second light guide area LA2 may be an area through which light incident through the second light incident part 210b travels to a relatively short distance. For example, the second light guide area LA2 may be defined as an area between the center portion CP and the second light incident part 210b including the partial light output area 200a.

The overlap area MA may be defined as an area through which light transferred through the first light guide area LA1 and light transferred through the second light guide area LA2 are combined and are output in the direction toward the upper surface. For example, the overlap area MA may be defined as an area between the first light guide area LA1 and the second light guide area LA2.

The partial light output area 200a may be defined in the second light guide area LA2 to overlap the partial display area of the liquid crystal display panel. The partial light output area 200a may be defined as an area through which main short-distance light transferred through the second light incident part 210b are output in a direction toward the partial display area of the liquid crystal display panel.

The plurality of lens patterns 213 may be arranged in parallel on a top of the base member 211 to have a curved surface. The plurality of lens patterns 213 may control paths of light which are incident on the inside of the base member 211 through the first and second light incident parts 210a and 210b, and may enhance linearity of the lights incident on the base member 211, thereby enhancing the partial luminance of the light guide member 210.

Each of the plurality of lens patterns 213 according to an aspect of the disclosure may be convexly provided on the top of the base member 211 to have a cylindrical shape including a cross-sectional surface having a semicircular shape. For example, each of the plurality of lens patterns 213 may have a lenticular lens form which is provided in parallel along a first horizontal axis direction X and long extends along a second horizontal axis direction Y. Here, the first horizontal axis direction X may be defined as a direction parallel to a short side lengthwise direction of the base member 211, and the second horizontal axis direction Y may be defined as a direction parallel to a long side lengthwise direction of the base member 211. Therefore, each of the plurality of lens patterns 213 may long extend from one side to the other side of a short side of the base member 211.

Each of the plurality of optical patterns 215 according to an aspect may be provided in a polygonal shape on a bottom of the base member 211. Each of the plurality of optical patterns 215 may have a polyhedron where a cross-sectional surface in a first direction X parallel to a lengthwise direction of the first light incident part 210a has a trapezoid shape and a cross-sectional surface in a second direction Y intersecting the lengthwise direction of the first light incident part 210a has an obtuse-angled triangular shape. Here, in each of the plurality of optical patterns 215, the cross-sectional surface in the second direction Y may have an asymmetric structure. Each of the plurality of optical patterns 215 may be an embossed pattern protruding from the bottom of the base member 211.

Each of the plurality of optical patterns 215 may have a density which progressively increases in a direction from each of the first and second light incident parts 210a and 210b of the base member 211 to the overlap area MA, in order to enhance linearity of light without obstructing diffusion of light incident through the first light incident part 210a.

The light guide member 210 enhances linearity of the light which is incident through each of the first and second light incident parts 210a and 210b by the lens patterns 213, and enables light to be partially output through each area according to the control of a light path based on a density of each of the optical patterns 215.

The reflective sheet 230 may be disposed on a bottom of the light guide member 210 and may reflect light, which is incident from the light guide member 210, toward the light guide member 210, thereby minimizing loss of the light.

The first light source unit 250 may be disposed adjacent to the first light incident part 210a of the light guide member 210 and may irradiate light onto the first light incident part 210a. In this case, the first light source unit 250 may have a luminous intensity which is higher than that of the second light source unit 270. That is, the first light source unit 250 may irradiate the light onto the first light guide area LA1 which is defined in the light guide member 210 to have a relatively wide area, and thus, may have a luminous intensity which is higher than that of the second light source unit 270.

The first light source unit 250 according to an aspect of the disclosure may include a plurality of first LED packages 253 including i (where i is a positive integer) number of LED chips which are mounted on a first light source printed circuit board (PCB) 251 and irradiate lights onto the first light incident part 210a.

The plurality of first LED packages 253 may be mounted on the first light source PCB 251 to face the first light incident part 210a and may be arranged at certain intervals along the first horizontal axis direction X. In this case, an interval (or a pitch) between adjacent LED packages 253 may be adjusted within a range where a hot spot does not occur in the first light incident part 210a. The plurality of first LED packages 253 may each include a high-luminous intensity LED chip.

The plurality of first LED packages 253 may be divided into a plurality of first light emitting array groups. Each of the plurality of first light emitting array groups may include one or more first LED packages 253 which are adjacent to each other in the first horizontal axis direction X, and the same or different number of first LED packages 253 may be included in the first light emitting array groups. Each of the first light emitting array groups may be individually driven according to local dimming driving.

The second light source unit 270 may be disposed adjacent to the second light incident part 210b of the light guide member 210 and may irradiate light onto the second light incident part 210b. That is, the second light source unit 270 may irradiate the light onto the second light guide area LA2 including the partial light output area 200a which is defined in the light guide member 210 to have a relatively narrow area. Particularly, when the liquid crystal display panel is partially driven, the second light source unit 270 may irradiate the light onto only the partial light output area 200a of the light guide member 210. Therefore, the second light source unit 270 may have a luminous intensity which is lower than that of the first light source unit 250.

The second light source unit 270 according to an aspect may include a plurality of second LED packages 273 including j (where j is a positive integer less than i) number of LED chips which are mounted on a second light source PCB 271 and irradiate lights onto the second light incident part 210b.

The plurality of second LED packages 273 may be mounted on the second light source PCB 271 to face the second light incident part 210b and may be arranged at certain intervals along the first horizontal axis direction X. In this case, an interval (or a pitch) between adjacent LED packages 273 may be adjusted within a range where hot spot does not occur in the second light incident part 210b. The plurality of second LED packages 273 may each include a high-efficiency LED chip.

The plurality of second LED packages 273 may be divided into a plurality of second light emitting array groups. Each of the plurality of second light emitting array groups may include one or more second LED packages 273 which are adjacent to each other in the first horizontal axis direction X, and a same or different number of second LED packages 273 may be included in the second light emitting array groups. Each of the second light emitting array groups may be individually driven according to local dimming driving. Particularly, each of the plurality of second light emitting array groups may be variously set depending on a position of the partial light output area 200a which is defined in the light guide member 210 to overlap the partial display area of the liquid crystal display panel.

The optical sheet part 290 may be disposed on the light guide member 210 and may include a lower diffusive sheet 291, a lower prism sheet 293, and an upper prism sheet 295, but is not limited thereto. In other aspects, the optical sheet part 290 may include a stacked combination of two or more elements selected from among a diffusive sheet, a prism sheet, a dual brightness enhancement film, and a lenticular sheet.

In the backlight unit according to an aspect of the present disclosure, a light intensity of the first light source unit 250 having high luminous intensity and a light intensity of the second light source unit 270 having high efficiency may be asymmetrically set, and thus, light may be intensively incident on only the partial light output area 200a of the light guide member 210 through the second light source unit 270 having high efficiency and the optical patterns 215, thereby minimizing consumption power when the light guide member 210 outputs partial light.

Figure 5:
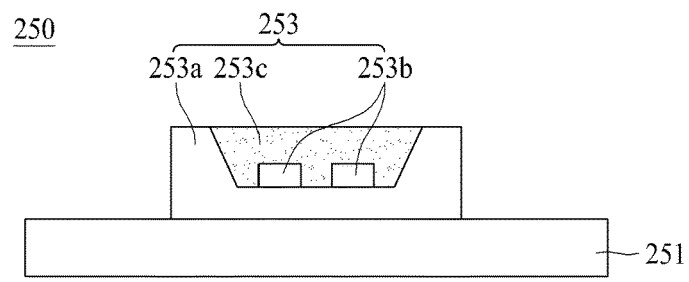
FIG. 5 is a cross-sectional view for describing a first LED package of a first light source unit illustrated in FIG. 3.

FIG. 5 is a cross-sectional view for describing the first LED package 253 of the first light source unit 250 illustrated in FIG. 3.

Referring to FIG. 5 along with FIG. 3, the first LED package 253 according to an aspect may be a high-luminous intensity LED package including i (where i is a positive integer equal to or more than two) number of first LED chips 253b. The first LED package 253 according to an aspect may include a first lead frame 253a, the i first LED chips 253b, and a first encapsulation layer 253c.

The first lead frame 253a may include a first recessed portion and may be mounted on the first light source PCB 251. The first recessed portion may be concavely provided to have an inclined surface from a top of the first lead frame 253a. The first lead frame 253a may include first and second lead electrodes which are connected to a plurality of driving power lines provided on the first light source PCB 251.

The i first LED chips 253b may be disposed on a floor of the first recessed portion provided in the first lead frame 253a and may be connected to the first and second lead electrodes. In this case, the i first LED chips 253b may be connected to each other in series or parallel through the first and second lead electrodes. Each of the i first LED chips 253b may emit light with a light source driving power supplied through the first lead frame 253a. For example, each of the i first LED chips 253b may emit blue light.

The first encapsulation layer 253c may be filled into the first recessed portion to cover the i first LED chips 253b and may be formed of a compound of an encapsulating material and a fluorescent material. Here, the fluorescent material may be a yellow fluorescent material, but is not limited thereto. In other aspects, the fluorescent material may be one or more color fluorescent materials for generating white light according to color light emitted from each of the i first LED chips 253b. Hereinafter, the fluorescent material is assumed as the yellow fluorescent material. The fluorescent material may absorb some of the blue light emitted from each of the i first LED chips 253b to emit yellow light. Therefore, in the first encapsulation layer 253c, white light may be emitted by a combination of the blue light emitted from each of the i first LED chips 253b and the yellow light emitted by the fluorescent material and may be output to the outside.

The first LED package 253 according to an aspect may include two first LED chips 253b, and thus, may irradiate high-luminous intensity light onto the first light incident part 210a of the light guide member 210.

Figure 6:
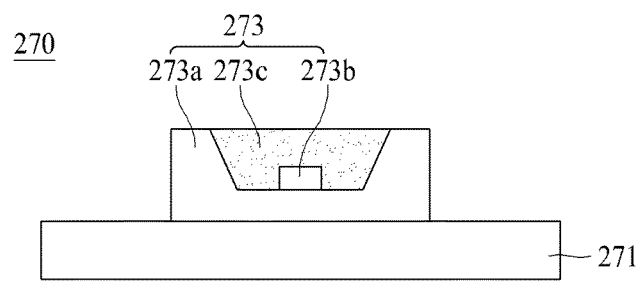
FIG. 6 is a cross-sectional view for describing a second LED package of a second light source unit illustrated in FIG. 3.

FIG. 6 is a cross-sectional view for describing the second LED package 273 of the second light source unit 270 illustrated in FIG. 3.

Referring to FIG. 6 along with FIG. 3, the second LED package 273 according to an aspect may be a high-efficiency LED package including j (where j is a positive integer less than i) number of second LED chips 273b. The second LED package 273 according to an aspect may include a second lead frame 273a, the j second LED chips 273b, and a second encapsulation layer 273c.

The second lead frame 273a may include a second recessed portion and may be mounted on the second light source PCB 271. The second recessed portion may be concavely provided to have an inclined surface from a top of the second lead frame 273a. The second lead frame 273a may include first and second lead electrodes which are connected to a plurality of driving power lines provided on the second light source PCB 271.

The j second LED chips 273b may be disposed on a floor of the second recessed portion provided in the second lead frame 273a and may be connected to the first and second lead electrodes. Here, the second LED package 273 according to an aspect may include one second LED chip 273b. Each of the j second LED chips 273b may emit light with the light source driving power supplied through the second lead frame 273a. For example, each of the j second LED chips 273b may emit blue light.

The second encapsulation layer 273c may be filled into the second recessed portion to cover the j second LED chips 273b and may be formed of a compound of an encapsulating material and a fluorescent material. Here, the fluorescent material may be a yellow fluorescent material, but is not limited thereto. In other aspects, the fluorescent material may be one or more color fluorescent materials for generating white light according to color light emitted from each of the j second LED chips 273b. Hereinafter, the fluorescent material is assumed as the yellow fluorescent material. The fluorescent material may absorb some of the blue light emitted from each of the j second LED chips 273b to emit yellow light. Therefore, in the second encapsulation layer 273c, white light may be emitted by a combination of the blue light emitted from each of the j second LED chips 273b and the yellow light emitted by the fluorescent material and may be output to the outside.

The second LED package 273 according to an aspect may include the j second LED chips 273b, and thus, may irradiate high-efficiency light onto the second light incident part 210b of the light guide member 210.

Figure 7:
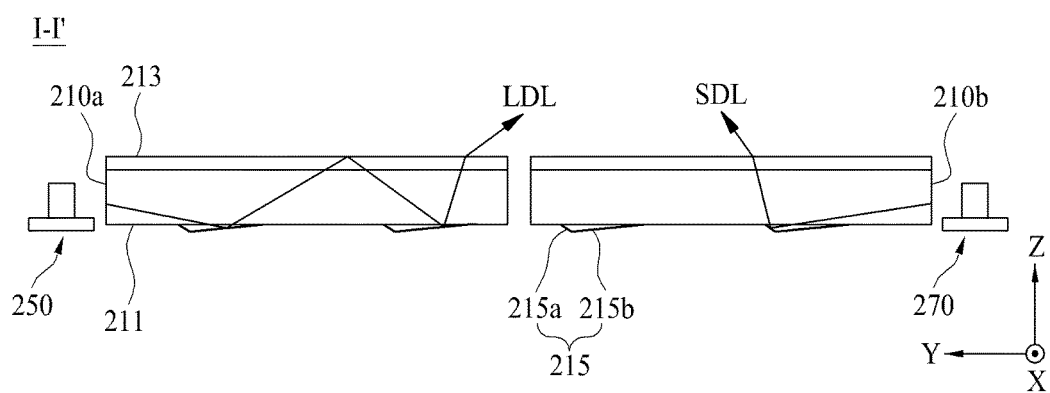
FIG. 7 is a cross-sectional view taken along line I-I' illustrated in FIG. 3, FIG. 7 being a diagram for describing a traveling path of light incident on a light guide member.
Figure 8:
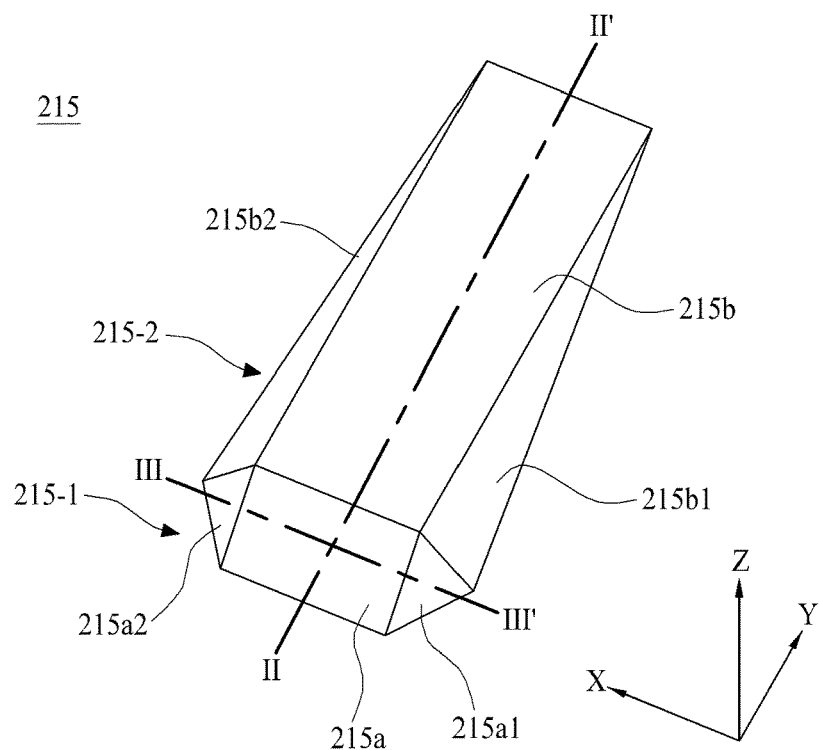
FIG. 8 is a diagram for describing an optical pattern illustrated in FIG. 4.
Figure 9:
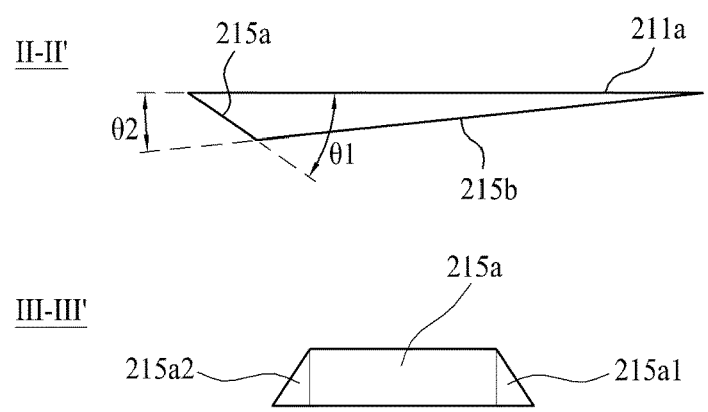
FIG. 9 is a cross-sectional view taken along each of line II-II' and line illustrated in FIG. 8.

FIG. 7 is a cross-sectional view taken along line I-I' illustrated in FIG. 3, FIG. 7 being a diagram for describing a traveling path of light incident on THE light guide member 210. FIG. 8 is a diagram for describing the optical pattern 215 illustrated in FIG. 4. FIG. 9 is a cross-sectional view taken along each of line II-If and line illustrated in FIG. 8.

Referring to FIGS. 7 to 9 along with FIG. 3, the optical pattern 215 according to an aspect of the present disclosure may include a first inclined portion 215-1 and a second inclined portion 215-2.

The first inclined portion 215-1 may include a first inclined surface 215a that faces the first light incident part 210a of the base member 211 and is inclined in a direction from a bottom 211a of the base member 211 to the second light incident part 210b. That is, the first inclined portion 215-1 may protrude in a right-angled triangular shape where a hypotenuse is the first inclined surface 215a inclined at a first angle "θ1" from the bottom 211a of the base member 211 with respect to a lengthwise direction Y of the optical pattern 215. In this case, the bottom 211a of the base member 211 may be defined as a base line of the first inclined portion 215-1.

The first inclined surface 215a may reflect light, which is incident through the second light incident part 210b, toward a top of the base member 211 to generate short-distance light SDL, thereby increasing intensity of light output to the second light guide area LA2 of the base member 211. That is, the light incident through the second light incident part 210b may be reflected toward the top of the base member 211 by the first inclined surface 215a and may be output to the second light guide area LA2 of the base member 211. To this end, the first inclined surface 215a may be inclined at the first angle "θ1" (for example, 30 degrees to 50 degrees) from the bottom 211a of the base member 211. That is, a first included angle "θ1" between the bottom 211a of the base member 211 and the first inclined surface 215a may be adjusted to 30 degrees to 50 degrees.

The second inclined portion 215-2 may include a second inclined surface 215b that faces the second light incident part 210b of the base member 211 and is inclined in a direction from the bottom 211a of the base member 211 to an end of the first inclined portion 215-1. That is, the second inclined portion 215-2 may protrude in a right-angled triangular shape where a hypotenuse is the second inclined surface 215b inclined at a second angle "θ2" from the bottom 211a of the base member 211 with respect to the lengthwise direction Y of the optical pattern 215. In this case, the bottom 211a of the base member 211 may be defined as a base line of the second inclined portion 215-2.

The second inclined surface 215b may reflect light, which is incident through the first light incident part 210a, toward the top of the base member 211 to generate long-distance light LDL, thereby increasing intensity of light output to the first light guide area LA1 of the base member 211. That is, the light incident through the first light incident part 210a may be reflected toward the top of the base member 211 by the second inclined surface 215b and may be output to the first light guide area LA1 of the base member 211. To this end, the second inclined surface 215b may be inclined at the second angle "θ2" (for example, 5 degrees to 10 degrees) from the bottom 211a of the base member 211. That is, a second included angle "θ2" between the bottom 211a of the base member 211 and the second inclined surface 215b may be adjusted to 5 degrees to 10 degrees.

The end of the first inclined portion 215-1 and an end of the second inclined portion 215-2 may be connected to each other, and thus, an included angle between the first inclined surface 215a and the second inclined surface 215b may be adjusted to an obtuse angle, for example, 120 degrees to 145 degrees.

In this manner, the optical pattern 215 may include the first inclined surface 215a inclined at the first angle "θ1" and the second inclined surface 215b inclined at the second angle "θ2" less than the first angle "θ1", and thus, may protrude from the bottom 211a of the base member 211 to have a triangular prism pattern form. In this case, the optical pattern 215 may include a cross-sectional surface having an isosceles triangular shape with respect to the lengthwise direction Y.

In addition, the optical pattern 215 may further include a first one-side inclined surface 215a1 and a first other-side inclined surface 215a2, which are provided in the first inclined part 215-1, and a second one-side inclined surface 215b1 and a second other-side inclined surface 215b2 which are provided in the second inclined part 215-2.

The first one-side inclined surface 215a1 may be inclined in a direction from one side of the first inclined surface 215a to the bottom 211a of the base member 211, and the first other-side inclined surface 215a2 may be inclined in a direction from the other side of the first inclined surface 215a to the bottom 211a of the base member 211. Therefore, a cross-sectional surface of the first inclined portion 215-1 parallel to a lengthwise direction of the first light incident part 210a may have a trapezoid shape. In the first one-side inclined surface 215a1 and the first other-side inclined surface 215a2, when the first inclined portion 215-1 is provided on the bottom 211a of the base member 211, the first inclined surface 215a is more easily patterned.

The second one-side inclined surface 215b1 may be inclined in a direction from one side of the second inclined surface 215b to the bottom 211a of the base member 211, and the second other-side inclined surface 215b2 may be inclined in a direction from the other side of the second inclined surface 215b to the bottom 211a of the base member 211. Therefore, a cross-sectional surface of the second inclined portion 215-2 parallel to the lengthwise direction of the first light incident part 210a may have a trapezoid shape. In the second one-side inclined surface 215b1 and the first other-side inclined surface 215b2, when the second inclined portion 215-2 is provided on the bottom 211a of the base member 211, the second inclined surface 215b is more easily patterned.

The optical pattern 215 according to an aspect of the present disclosure may change a traveling path of light incident through the second light incident part 210b by the first inclined portion 215-1 and may change a traveling path of light incident through the first light incident part 210a by the second inclined portion 215-2. Accordingly, when the backlight unit is wholly driven, uniform light is output through a whole portion of the light guide member 210, and when the backlight unit is partially driven, light is output through only the partial light output area 200a of the light guide member 210.

FIGS. 10A to 10D are simulation results obtained by measuring a luminance distribution on line A-A' and output light luminance of a light guide member with respect to an angle of a second inclined surface, in an optical pattern according to an aspect of the present disclosure. In the simulation, a ratio of a luminous flux of a first light source part to a luminous flux of a second light source part is set to 1:0.6.

Figure 10A:
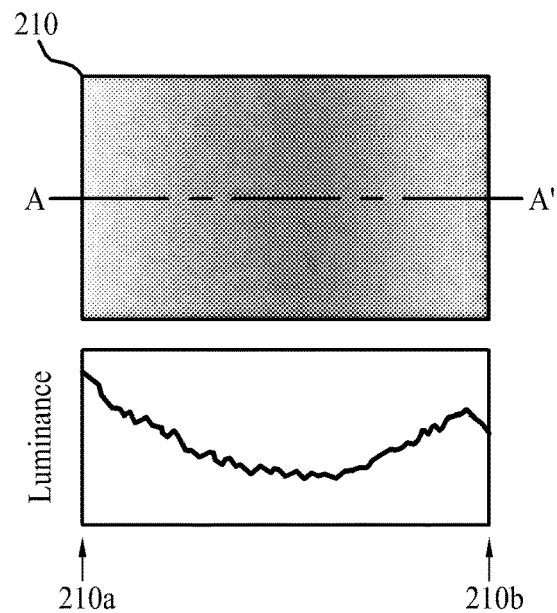
FIGS. 10A to 10D are simulation results obtained by measuring a luminance distribution on line A-A' and output light luminance of a light guide member with respect to an angle of a second inclined surface, in an optical pattern according to an aspect of the present disclosure.

First, an optical pattern of a first comparative example illustrated in FIG. 10A includes a first inclined surface inclined by 35 degrees and a second inclined surface inclined by 15 degrees. In the optical pattern of the first comparative example, it can be seen that as light incident through the first light incident part 210a is reflected by the second inclined surface, a long distance which the light incident through the first light incident part 210a reaches is reduced, and for this reason, light intensity is excessively high in the first light incident part 210a.

Figure 10B:
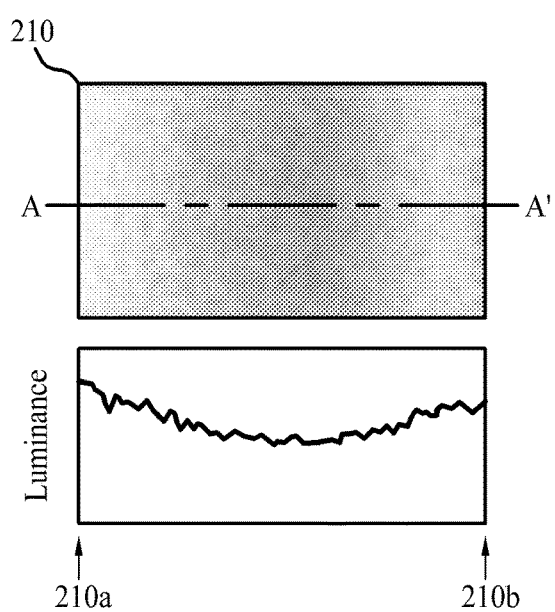

Moreover, an optical pattern of an aspect of the preset disclosure illustrated in FIG. 10B includes a first inclined surface inclined by 35 degrees and a second inclined surface inclined by 10 degrees. In the optical pattern of the aspect of the preset disclosure, it can be seen that as an angle of the second inclined surface is reduced compared to the first comparative example, a long distance which the light incident through the first light incident part 210a reaches increases, and thus, intensity of light distributed in a center portion of the light guide member 210 increases.

Figure 10C:
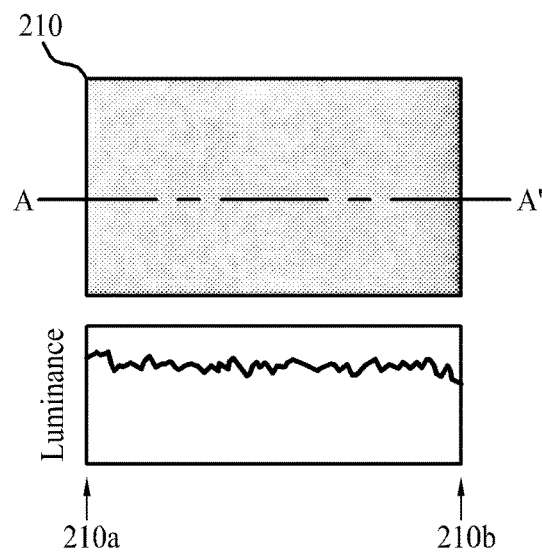

Moreover, an optical pattern of another aspect of the preset disclosure illustrated in FIG. 10C includes a first inclined surface inclined by 35 degrees and a second inclined surface inclined by 5 degrees. In the optical pattern of the another aspect of the preset disclosure, it can be seen that as an angle of the second inclined surface is further reduced compared to the first comparative example and the aspect of the present disclosure, a long distance which the light incident through the first light incident part 210a reaches increases further, and thus, intensity of light distributed in a center portion of the light guide member 210 is wholly uniform.

Figure 10D:
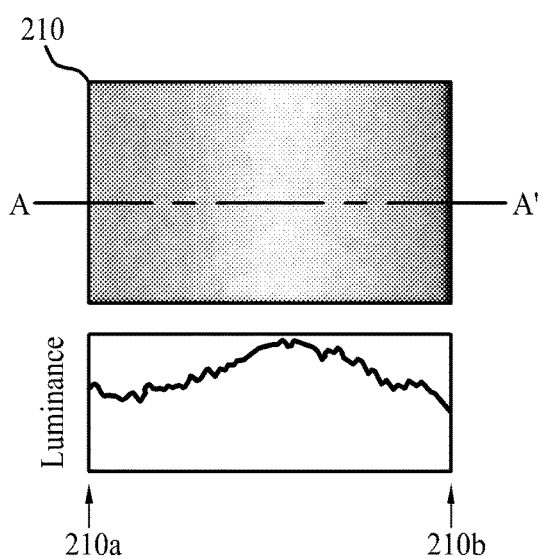

Moreover, an optical pattern of a second comparative example illustrated in FIG. 10D includes a first inclined surface inclined by 35 degrees and a second inclined surface inclined by 3 degrees. In the optical pattern of the second comparative example, it can be seen that as an angle of the second inclined surface is further reduced compared to the another aspect of the present disclosure, the light incident through the first light incident part 210a reaches the center portion or more of the light guide member 210, and for this reason, light intensity is excessively high in the second light incident part 210b.

As a result, as seen in FIGS. 10A to 10D, the second inclined surface 215b of the optical pattern 215 according to an aspect of the present disclosure may be inclined by 5 degrees to 10 degrees. That is, a first included angle between the bottom 211a of the base member 211 and the second inclined surface 215b may be adjusted to 5 degrees to 10 degrees.

Figure 11:
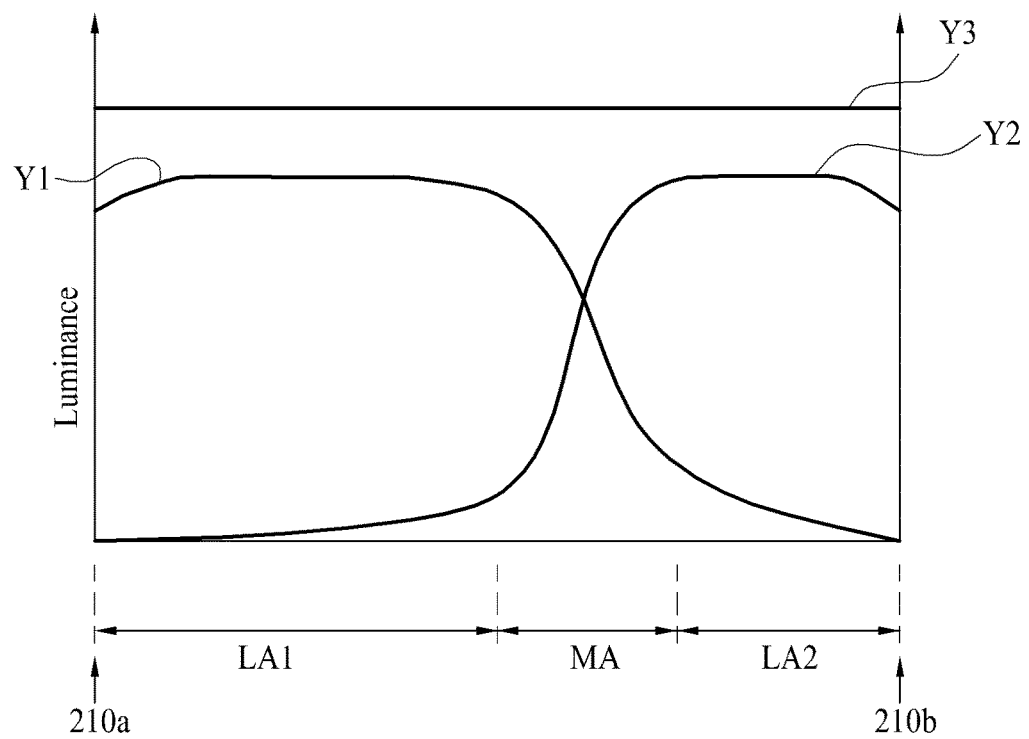
FIG. 11 is a graph showing a luminance distribution with respect to a position of a light guide member by first and second light source units according to an aspect of the present disclosure.

FIG. 11 is a graph showing a luminance distribution with respect to a position of a light guide member by first and second light source units according to an aspect of the present disclosure.

Referring to FIG. 11 along with FIGS. 3 and 4, in the backlight unit according to an aspect of the present disclosure, light is irradiated onto the first light incident part 210a of the light guide member 210 through driving of the first light source unit 250 having high luminous intensity, and light is irradiated onto the second light incident part 210b of the light guide member 210 through driving of the second light source unit 270 having high luminous intensity. In this case, luminance Y1 of light which is incident on the light guide member 210 through the first light incident part 210a by driving of the first light source unit 250 has a uniform distribution up to the first light guide area LA1 by the second inclined surface 215b of each of the plurality of optical patterns 215 and a density between the plurality of optical patterns 255, and then, is reduced in a direction from the overlap area MA to the second light guide area LA2. On the other hand, luminance Y2 of light which is incident on the light guide member 210 through the second light incident part 210b by driving of the second light source unit 270 has a uniform distribution up to the second light guide area LA2 by the first inclined surface 215a of each of the plurality of optical patterns 215 and a density between the plurality of optical patterns 255, and then, is reduced in a direction from the overlap area MA to the first light guide area LA1.

When both the first and second light source units 250 and 270 are driven based on an area-based luminance distribution of the light guide member 210 according to a light intensity difference between the first and second light source units 250 and 270, luminance Y3 of light output from the light guide member 210 is uniform all over the light guide member 210. In this case, lights which are incident according to driving of first and second light source units 250 and 270 may be combined in the overlap area MA, and thus, luminance of the overlap area MA is equal to that of each of the first and second light guide areas LA1 and LA2.

Moreover, when only the second light source unit 270 is driven based on an area-based luminance distribution of the light guide member 210 according to a light intensity difference between the first and second light source units 250 and 270, intensity of light output to the partial light output area of the light guide member 210 increases, and consumption power is minimized.

Figure 12A:
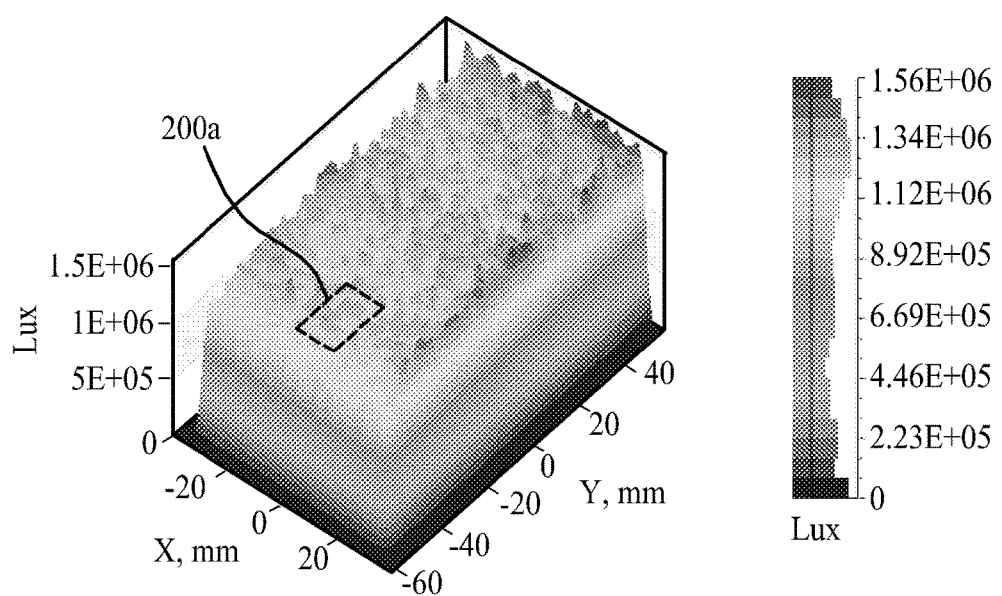
FIGS. 12A and 12B are diagrams showing an illuminance distribution of light reaching a light guide member by each of first and second light source units in a backlight unit according to an aspect of the present disclosure.
Figure 12B:
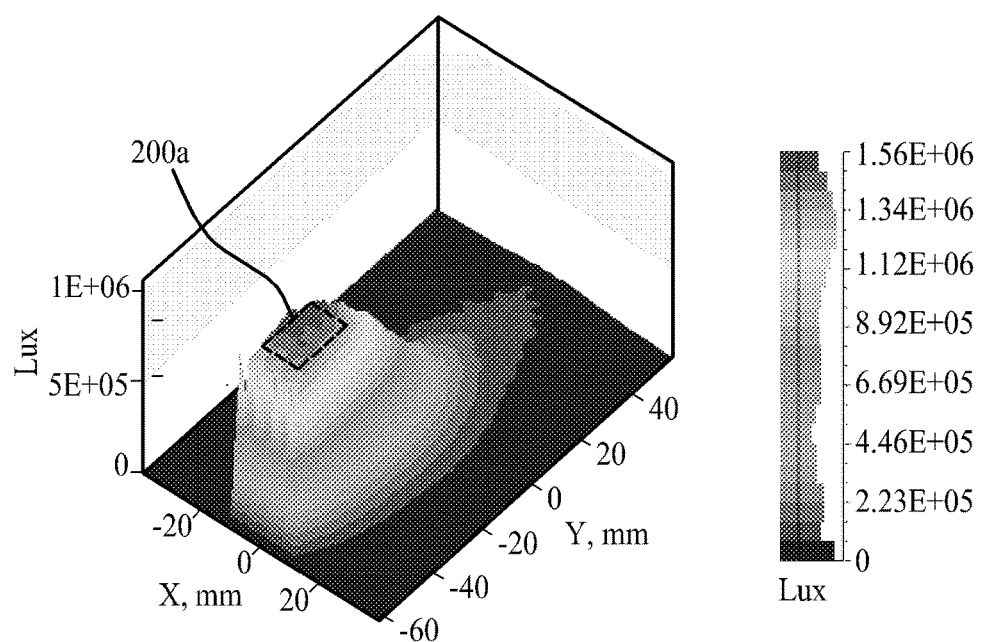

FIGS. 12A and 12B are diagrams showing an illuminance distribution of light reaching a light guide member by each of first and second light source units in a backlight unit according to an aspect of the present disclosure.

Referring to FIG. 12A along with FIG. 3, when both the first and second light source units 250 and 270 are fully driven, it can be seen that an illuminance of the light guide member 210 is wholly uniform and has a high value.

Therefore, the backlight unit according to an aspect of the present disclosure has high luminance through full driving of the first and second light source units 250 and 270.

Referring to FIG. 12B along with FIG. 3, when only a portion of the second light source unit 270 corresponding to the partial light output area 200a defined in the light guide member 210 is driven, it can be seen that light emitted from the second light source unit 270 is intensively output through the partial light output area 200a of the light guide member 210. Therefore, when the backlight unit according to an aspect of the present disclosure is partially driven, consumption power is minimized through divisional driving of the second light source unit 270, and the light emitted from the second light source unit 270 is intensively output through the partial light output area 200a of the light guide member 210.

FIGS. 13A to 13D are diagrams for describing an illuminance distribution of light reaching a light guide member by partial driving in first to third comparative examples and an aspect of the present disclosure.

Figure 13A:
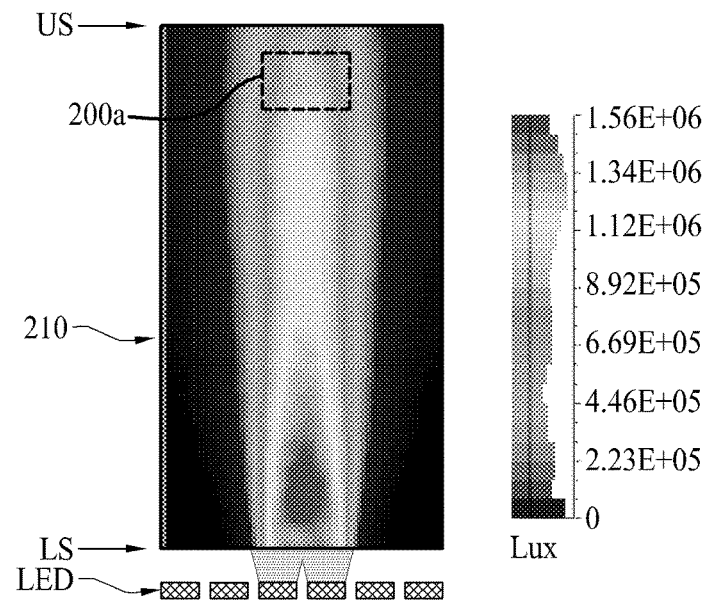
FIGS. 13A to 13D are diagrams for describing an illuminance distribution of light reaching a light guide member by partial driving in first to third comparative examples and an aspect of the present disclosure.

FIG. 13A shows a simulation result obtained by measuring an illuminance distribution of light reaching a light guide member in partial driving of a first comparative example. In this case, an LED is disposed on a lower side LS of the light guide member 210, and the partial light output area 200a is provided on an upper side US of the light guide member 210. As seen in FIG. 13A, in the first comparative example, by divisionally driving LEDs, light is irradiated onto the light guide member 210 and is output through the partial light output area 200a. Here, a light intensity of the LED is 33%, illuminance in the partial light output area 200a has been measured as about 9.00E+05 (Lux), and consumption power has been measured as 25 mW.

Figure 13B:
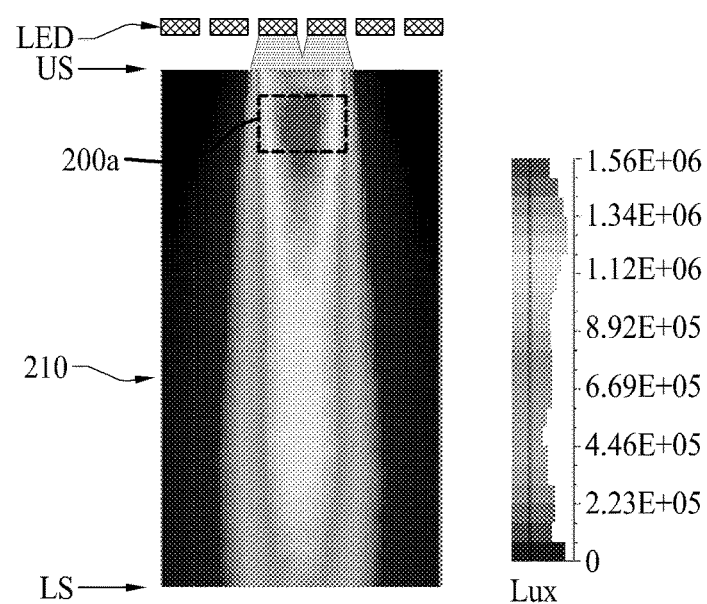

FIG. 13B shows a simulation result obtained by measuring an illuminance distribution of light reaching a light guide member in partial driving of a second comparative example. In this case, an LED is disposed on the upper side US of the light guide member 210, and the partial light output area 200a is provided on the upper side US of the light guide member 210. As seen in FIG. 13B, in the second comparative example, by divisionally driving LEDs, light is irradiated onto the light guide member 210 and is output through the partial light output area 200a. Here, a light intensity of the LED is 33%, illuminance in the partial light output area 200a has been measured as about 1.56E+06 (Lux), and consumption power has been measured as 22.8 mW. In the second comparative example, consumption power is reduced by about 9% in comparison with the first comparative example.

Figure 13C:
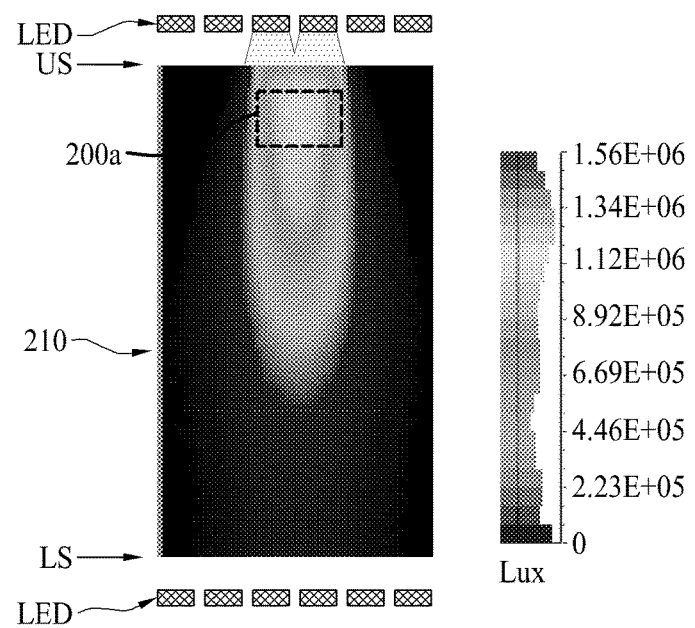

FIG. 13C shows a simulation result obtained by measuring an illuminance distribution of light reaching a light guide member in partial driving of a third comparative example. In this case, an LED is disposed on each of the upper side US and the lower side LS of the light guide member 210, and the partial light output area 200a is provided on the upper side US of the light guide member 210. As seen in FIG. 13C, in the third comparative example, by divisionally driving LEDs, light is irradiated onto the light guide member 210 and is output through the partial light output area 200a. Here, a light intensity of the LED is 17%, illuminance in the partial light output area 200a has been measured as about 1.10E+06 (Lux), and consumption power has been measured as 16 mW. In the third comparative example, consumption power is reduced by about 36% in comparison with the first comparative example.

In addition, in the third comparative example, in whole driving, each of an upper LED and a lower LED is driven at 50% light intensity.

Figure 13D:
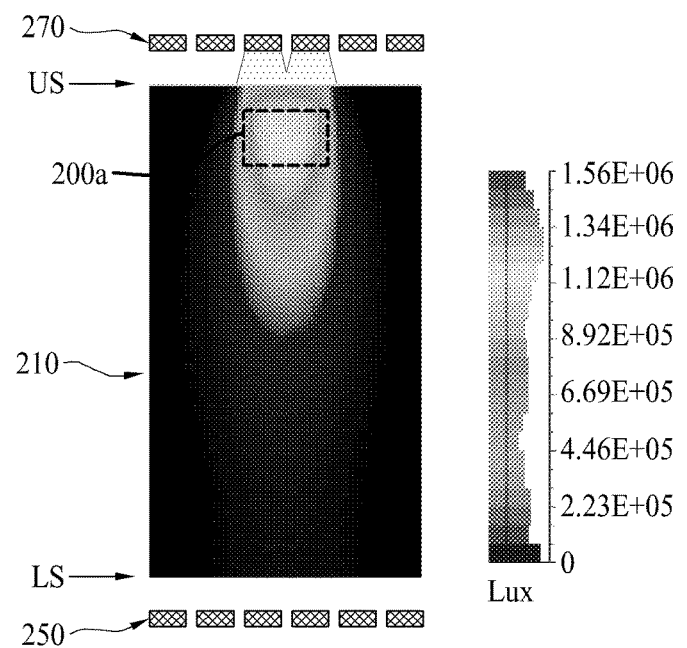

FIG. 13D shows a simulation result obtained by measuring an illuminance distribution of light reaching a light guide member in partial driving of an embodiment of the present invention. In this case, the first light source unit 250 having high luminous intensity is the lower side LS of the light guide member 210, the second light source unit 270 having luminous intensity which is lower than that of the first light source unit 250 is the upper side US of the light guide member 210, and the partial light output area 200a is provided on the upper side US of the light guide member 210. As seen in FIG. 13C, in an embodiment of the present invention, through divisional driving of the second light source unit 270, light is irradiated onto the second light incident part of the light guide member 210 and is output through the partial light output area 200a. Here, a light intensity of the second light source unit 270 is 12%, illuminance in the partial light output area 200a has been measured as about 1.10E+06 (Lux), and consumption power has been measured as 13 mW. In an embodiment of the present invention, consumption power is reduced by about 48% in comparison with the first comparative example, and consumption power of 3 mW is further reduced than the third comparative example.

In addition, in an aspect of the present disclosure, in whole driving, the first light source unit 250 is driven at 65% light intensity, and the second light source unit 270 is driven at 35% light intensity. Therefore, in an aspect of the present disclosure, in whole driving, light intensities of the first light source unit 250 and the second light source unit 270 are asymmetrically adjusted, thereby reducing consumption power of the backlight unit.

As described above, in the backlight unit according to an aspect of the present disclosure, the first light source unit 250 having high luminous intensity may be disposed in the first light incident part 210a of the light guide member 210, the second light source unit 270 having high efficiency may be disposed in the second light incident part 210b of the light guide member 210, and the optical patterns 215 having an asymmetric structure and including an inclined surface may be provided on a rear surface of the light guide member 210. Accordingly, through divisional driving of the second light incident part 210b, light incident on the light guide member 210 is intensively output through the partial light output area 200a, and thus, consumption power is reduced.

Figure 14:
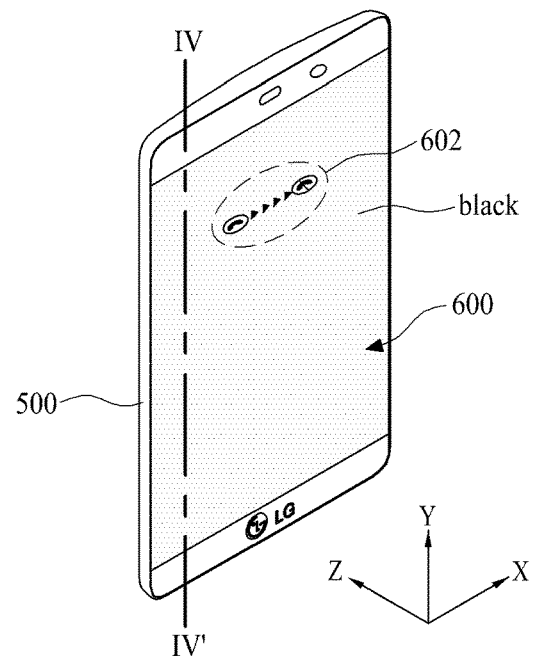
FIG. 14 is a diagram for describing a mobile electronic device according to an aspect of the present disclosure.
Figure 15:
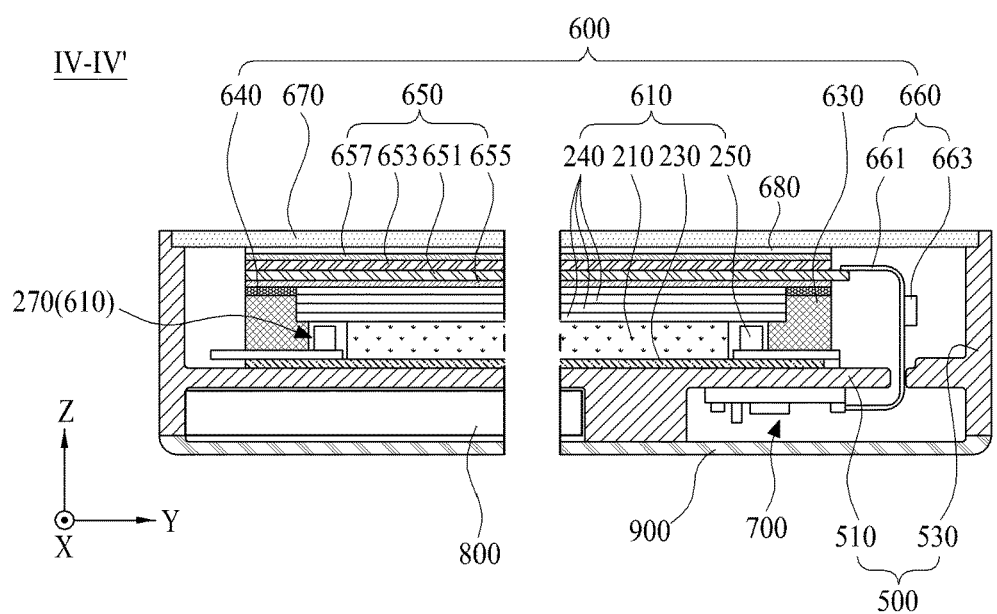
FIG. 15 is a cross-sectional view taken along line IV-IV' illustrated in FIG. 14.

FIG. 14 is a diagram for describing a mobile electronic device according to an aspect of the present disclosure, and FIG. 15 is a cross-sectional view taken along line IV-IV' illustrated in FIG. 14.

Referring to FIGS. 14 and 15, the mobile electronic device according to an aspect of the present disclosure may include a housing 500 and a liquid crystal display module 600.

The housing 500 may include an accommodating space which is defined by a floor 510 and a housing side wall 530. The housing 500 may have a box shape with a top opened. The housing 500 may be formed of a metal material, a plastic material, and/or the like. Here, the housing 500 may be formed of a metal material (for example, aluminum (Al), invar, magnesium (Mg), or the like) for effectively dissipating heat which occurs in the liquid crystal display module 600.

The accommodating space may be disposed on the floor 510 of the housing 500 and may accommodate the liquid crystal display module 600.

At least one system accommodating space may be provided in a rear surface of the housing 500. A system driving circuit unit 700, a battery 800 for supplying a driving power, a communication module, a power circuit, a memory, and/or the like which are included in the mobile electronic device may be accommodated into the system accommodating space. The rear surface of the housing 500 may be covered by a rear cover 900. The rear cover 900 may be coupled to the rear surface of the housing 500 so as to be opened or closed for replacing the battery 800, but is not limited thereto. In other aspects of the disclosure, when the mobile electronic device uses an embedded-type battery 800, the rear cover 900 may be coupled to the rear surface of the housing 500 so as not to be opened or closed by a user.

The liquid crystal display module 600 may display an image corresponding to an image signal supplied from the system driving circuit unit 700 or may detect a position touched by a user. That is, in a display mode, the liquid crystal display module 600 may display the image corresponding to the image signal supplied from the system driving circuit unit 700. Also, in a touch sensing mode, the liquid crystal display module 600 may detect the position touched by the user and may supply a sensing signal, corresponding to the touched position, to the system driving circuit unit 700. Also, the liquid crystal display module 600 may display a partial display screen 602 on a predetermined partial display area. The liquid crystal display module 600 according to an embodiment may include a backlight unit 610, a guide frame 630, a liquid crystal display panel 650, and a cover window 670.

The backlight unit 610 may include a light guide plate 210, a light source unit 220, a reflective sheet 230, and an optical sheet part 240. The backlight unit 610 has the same configuration as that of the backlight unit described above with reference to FIGS. 3 to 9, and thus, its detailed description is not repeated. Like reference numerals refer to like elements.

The guide frame 630 may be provided in a tetragonal belt shape and may support a rear edge of the liquid crystal display panel 650. Also, the guide frame 630 may surround a side surface of the backlight unit 610, thereby minimizing a movement of the backlight unit 610. The guide frame 630 according to an embodiment may be attached to an edge of the reflective sheet 230 and may support the rear edge of the liquid crystal display panel 650. To this end, the reflective sheet 230 may include an extension area that supports a bottom of the guide frame 630. The extension area of the reflective sheet 230 may extend from each of side surfaces of the reflective sheet 230 to overlap the bottom of the guide frame 630 and may be coupled to the bottom of the guide frame 630 by an adhesive.

The guide frame 630 may be physically coupled to the rear edge of the liquid crystal display panel 650 by a panel adhesive member 640. Here, the panel adhesive member 640 may be a double-sided tape, a thermocurable resin, a photocurable resin, a double-sided adhesive foam pad, or the like.

The liquid crystal display panel 650 may include a lower substrate 651 and an upper substrate 653 which are opposite-bonded to each other with a liquid crystal layer therebetween, and may display a certain image by using light irradiated from the backlight unit 610.

The lower substrate 651 may be a TFT array substrate and may include a plurality of pixels respectively provided in a plurality of pixel areas where a plurality of gate lines intersects a plurality of data lines. Each of the plurality of pixels may include a TFT connected to a corresponding gate line and a corresponding data line, a pixel electrode connected to the TFT, and a common electrode which is provided adjacent to the pixel electrode and is supplied with a common voltage.

A pad part connected to each of a plurality of signal lines may be provided in a lower edge of the lower substrate 651 and may be connected to the panel driving circuit unit 660. Also, a gate driving circuit for supplying a gate signal to the gate lines of the liquid crystal display panel 650 may be provided on a left and/or right edge of the lower substrate 651. The gate driving circuit may be connected to the gate lines and may be manufactured simultaneously with a process of manufacturing the TFT of each pixel.

The upper substrate 653 may include a pixel defining pattern, which defines an opening area overlapping each pixel area provided in the lower substrate 651, and a color filter which is provided in the opening area. The upper substrate 653 may be opposite-bonded to the lower substrate 651 by a sealant with the liquid crystal layer therebetween and may cover the other whole portion of the lower substrate 651 except the pad part of the lower substrate 651.

At least one of the lower substrate 651 and the upper substrate 653 may include an alignment layer for adjusting a pre-tilt angle of liquid crystal. The liquid crystal layer may be disposed between the lower substrate 651 and the upper substrate 653 and may include liquid crystal consisting of liquid crystal molecules which are aligned in a horizontal direction according to a lateral electric field generated by a data voltage and the common voltage applied to each of the plurality of pixels.

A lower polarizing member 655 having a first polarization axis may be attached to the rear surface of the lower substrate 651, and an upper polarizing member 657 having a second polarization axis intersecting the first polarization axis may be attached to a front surface of the upper substrate 653.

In the liquid crystal display panel 650, the common electrode may be used as a touch sensing electrode in the touch sensing mode, and in the display mode, the common electrode may be used as a liquid crystal driving electrode along with the pixel electrode. That is, the liquid crystal display panel 650 may be an in-cell touch type liquid crystal display panel, and in more detail, the liquid crystal display panel 650 may be a self-capacitance in-cell touch type liquid crystal display panel. For example, the in-cell touch type liquid crystal display panel may be a liquid crystal display panel of a liquid crystal display device integrated with touch sensor disclosed in Korean Patent Publication No. 10-2013-0015584, but is not limited thereto.

The panel driving circuit unit 660 may be connected to the pad part provided on the lower substrate 651, and each pixel of the liquid crystal display panel 650 may be driven according to control by the system driving circuit unit 700, thereby displaying a certain color image on the liquid crystal display panel 650. Also, the panel driving circuit unit 660 may display the partial display screen 602 on the partial display area defined in the liquid crystal display panel 650 according to control by the system driving circuit unit 700. The panel driving circuit unit 660 according to an embodiment may include a flexible circuit film 661 and a display driving integrated circuit (IC) 663.

The flexible circuit film 661 may be connected to the pad part provided on the lower substrate 651 and may be connected to the system driving circuit unit 700. The flexible circuit film 661 may provide an interface between the display driving IC 663 and the system driving circuit unit

700 and may transfer a signal, output from the display driving IC 663, to the pad part.

In the display mode, the display driving IC 663 may drive each pixel by using image data and a control signal which are supplied from the system driving circuit unit 700. Also, in the touch mode, the display driving IC 663 may supply a touch driving pulse to the common electrode through a touch driving line, may sense through the touch driving line a capacitance variation of the common electrode caused by a user touch to generate touch position data and may supply the touch position data to the system driving circuit unit 700.

The system driving circuit unit 700 may overall control the mobile electronic device and may supply an image signal and the control signal to the liquid crystal display module 600. The system driving circuit unit 700 may execute an application corresponding to the touch position data supplied from the display driving IC 663.

In a standby mode of the mobile electronic device, the system driving circuit unit 700 may execute a partial display application installed in the mobile electronic device to display the partial display screen 602 on the partial display area defined in a screen of the liquid crystal display panel 650 and may divisionally drive the second light source unit 270 of the backlight unit 610 in order for light to be irradiated onto only a partial luminance area corresponding to the partial display area of the liquid crystal display panel 650. In this case, when an accessory cover for protecting the mobile electronic device covers the screen of the liquid crystal display panel 650, the system driving circuit unit 700 may drive the mobile electronic device in the standby mode.

The cover window 670 may cover the whole front surface of the liquid crystal display panel 650 and may be supported by the housing side wall 530 of the housing 500. In this case, the cover window 670 may be physically attached to the whole front surface of the liquid crystal display panel 650 by a transparent adhesive 680, for example, an optical clear adhesive (OCA), an optical clear resin (OCR), or the like, thereby protecting the liquid crystal display panel 650 from an external impact. The cove window 670 may be formed of tempered glass, transparent plastic, a transparent film, or the like. For example, the cover window 670 may include at least one of sapphire glass and gorilla glass. As another example, the cover window 670 may include at least one of polyethyleneterephthalate (PET), polycarbonate (PC), polyethersulfone (PES), polyethylenapthanate (PEN), and polynorborneen (PNB). The cover window 670 may be formed of tempered glass, based on scratch and transparency.

In the mobile electronic device according to an aspect of the present disclosure, when the partial display screen 602 is displayed on the partial display area by partially driving the liquid crystal display panel 650, light may be irradiated onto only the partial display area of the liquid crystal display panel 650 by partially (or divisionally) driving the backlight unit 610, and thus, consumption power is minimized in displaying the partial display screen 602 on the partial display area of the liquid crystal display panel 650.

In addition, a smartphone is illustrated as an electronic device according to an aspect of the present disclosure in FIG. 14, but is not limited thereto. An aspect of the present disclosure may be applied to portable electronic devices, such as electronic notebooks, e-books, portable multimedia players (PMPs), navigation devices, ultra-mobile personal computers (UMPCs), mobile phones, tablet PCs, smartwatches, watch phones, wearable devices, mobile communication terminals, etc., and appliances such as televisions (TVs), notebook computers, monitors, camcorders, displays, etc.

As described above, according to the aspects of the present disclosure, consumption power of the backlight unit is minimized when realizing partial luminance.

Moreover, according to the aspects of the present disclosure, since light is irradiated onto only the partial display area of the liquid crystal display panel through partial driving of the backlight unit, consumption power of the mobile electronic device is minimized, and moreover, the partial display screen is displayed on the liquid crystal display panel.

It will be apparent to those skilled in the art that various modifications and variations can be made in the present aspect without departing from the spirit or scope of the disclosure. Thus, it is intended that the present disclosure covers the modifications and variations of this disclosure provided they come within the scope of the appended claims and their equivalents.

What is claimed is:

1. A backlight unit comprising:
a light guide member including a base member having a first light incident part on a first side surface of the base member and a second light incident part on a second side surface of the base member opposite to the first side surface, and a plurality of optical patterns provided on a bottom of the base member,
wherein the light guide member has a first light guidance area adjacent to the first light incident part and a second guidance area adjacent to the second light incident part, a center portion located at an equal distance between the first and second guidance areas, an overlap area where light transmitted through the first light guide area and light transmitted through the second light guide area are combined and output in a direction toward a upper surface, and a partial light output area that is pre-determined and non-variable during operation of the backlight is disposed at the second guidance area where each optical pattern has an asymmetric cross-section with respect to a Y-axis and disposed adjacent to the overlap area;
a first light source unit disposed at the first light incident part; and
a second light source unit disposed at the second light incident part,
wherein both the first and second light source units are driven to have uniform luminance during a normal driving mode with the first light source unit driven with a luminous intensity higher than the second light source unit, and only the second light source unit is driven to irradiate light onto the partial light output area guided by the light guide member defined for the partial light output area during a partial driving mode.

2. The backlight unit of claim 1, further comprising a plurality of lens patterns provided on a top of the base member.

3. The backlight unit of claim 1, wherein the plurality of optical patterns has a trapezoid shape cross-section in a first direction parallel to a lengthwise direction of the first light incident part, and an obtuse-angled triangular shape cross-section in a second direction intersecting the lengthwise direction of the first light incident part.

4. The backlight unit of claim 1, wherein the partial light output area has a smaller width than the backlight unit.

5. The backlight unit of claim 1, wherein the second light source unit irradiating light onto the partial light output area has a maximum luminous intensity lower than a maximum luminous intensity of the first light source unit.

6. The backlight unit of claim 1, wherein
the first light source unit comprises a plurality of first light emitting diode (LED) packages including i (where i is a positive integer equal to or more than two) number of LED chips, and
the second light source unit comprises a plurality of second LED packages including j (where j is a positive integer less than i) number of LED chips.

7. The backlight unit of claim 6, wherein the light guide member outputs light, which is incident from a part of the plurality of second LED packages, toward the partial light output area.

8. The backlight unit of claim 1, wherein each of the plurality of optical patterns comprises:
a first inclined portion including a first inclined surface inclined in a direction from a bottom of the base member to the second light incident part facing the first light incident part; and
a second inclined portion including a second inclined surface inclined in a direction from the bottom of the base member to an end of the first inclined portion facing the second light incident part.

9. The backlight unit of claim 8, wherein the first inclined surface reflects incident light from the second light incident part toward an upper part of the base member to generate a short distance light.

10. The backlight unit of claim 8, wherein the second inclined surface reflects incident light from the first light incident part toward an upper part of the base member to generate a long distance light.

11. The backlight unit of claim 8, wherein the first inclined portion changes a traveling path of light incident through the second light incident part and the second portion changes a traveling path of light incident through first light incident part, so that the light guide member outputs uniform light through a whole portion when the entire backlight unit is driven and outputs partial light when the backlight unit is partially driven.

12. The backlight unit of claim 8, wherein
the bottom of the base member and the first inclined surface form a first included angle greater than a second included angle formed between the bottom of the base member and the second inclined surface, and
the first inclined surface and the second inclined surface form an obtuse angle.

13. The backlight unit of claim 12, wherein
the first included angle between the bottom of the base member and the first inclined surface is about 30 degrees to 50 degrees, and
the second included angle between the bottom of the base member and the second inclined surface is about 5 degrees to 10 degrees.

14. A mobile electronic device comprising:
a backlight unit comprising,
a light guide member including a base member having a first light incident part on a first side surface of the base member and a second light incident part on a second side surface of the base member opposite to the first side surface, and a plurality of optical patterns provided on a bottom of the base member,
wherein the light guide member has a first light guidance area adjacent to the first light incident part and a second guidance area adjacent to the second light incident part, a center portion located at an equal distance between the first and second guidance areas, an overlap area where light transmitted through the first light guide area and light transmitted through the second light guide area are combined and output in a direction toward an upper direction, and a partial light output area that is pre-determined and non-variable during operation of the backlight disposed at the second guidance area where each optical pattern has an asymmetric cross-section with respect to a Y-axis and disposed adjacent to the overlap area;
a first light source unit disposed at the first light incident part; and
a second light source unit disposed at the second light incident part,
a housing accommodating the backlight unit;
a liquid crystal display panel disposed on the backlight unit and accommodated into the housing; and
a cover window supported by the housing to cover the liquid crystal display panel,
wherein both the first and second light source units are driven to have uniform luminance throughout the light guide member the during a normal driving mode with the first light source unit driven with a luminous intensity higher than the second light source unit, and only the second light source unit is driven to irradiate light onto the partial light output area guided by the light guide member defined for the partial light output area during a partial driving mode.

15. The mobile electronic device of claim 14, wherein the second light source unit irradiating light onto the partial light output area has a maximum luminous intensity lower than a maximum luminous intensity of the first light source unit.

16. The mobile electronic device of claim 14, wherein
the first light source unit comprises a plurality of first light emitting diode (LED) packages including i (where i is a positive integer equal to or more than two) number of LED chips, and
the second light source unit comprises a plurality of second LED packages including j (where j is a positive integer less than i) number of LED chips.

17. The mobile electronic device of claim 16, further comprising: a panel driving circuit unit connected to the liquid crystal display panel and accommodated into the housing,
wherein
the panel driving circuit unit displays a partial display screen on a partial display area defined in the liquid crystal display panel, and
the backlight unit selectively drives the plurality of second LED packages to irradiate light onto the partial display area.

18. The mobile electronic device of claim 14, wherein the liquid crystal display panel comprises a partial display area displaying a partial display screen in a standby mode,
wherein the partial display area overlaps the partial light output area, and
wherein the second light source unit irradiates the light onto only the partial light output area in the standby mode.

19. The mobile electronic device of claim 18, wherein the second light source unit has a luminous flux lower than a luminous flux of the first light source unit.

* * * * *